Patented Dec. 13, 1932

1,890,866

UNITED STATES PATENT OFFICE

ERWIN SCHWENK, OF BERLIN-WESTEND, GERMANY, ASSIGNOR, BY MESNE ASSIGNMENTS, TO GENERAL ANILINE WORKS, INC., OF NEW YORK, N. Y., A CORPORATION OF DELAWARE

MAKING ANTHRAQUINONE-SULPHONIC ACIDS

No Drawing. Application filed March 11, 1931, Serial No. 521,875, and in Germany December 31, 1929.

This invention relates to a method for making sulphonic acids of substances of the anthraquinone series and has for its main object to provide for a general method for the manufacture of these sulphonic acids in good yields.

A further object of the invention is to obtain the sulphonic acids of substances of the anthraquinone series as uniform products, which is not possible by the usual direct sulphonation of anthraquinone and its homologues.

A further object of the invention is to reduce the expenses and labor for making pure and uniform sulphonic acids of substances of the anthraquinone series, which are suitable as starting material for the manufacture of anthraquinone dye-stuffs.

The invention consists in principle in treating with substances causing ring formation, such as sulphuric acid, chlorosulphonic acid and the like, sulphonic acids or sulphonic acid salts of aroylarylcarboxylic acids obtained by condensing the sulphonic acids or the sulphonic acid salts of phthalic acid anhydride with aromatic hydrocarbons such as benzene, naphthalene and the like or their substitution products such as chlorobenzene, chlorophenol, hydroquinone and the like in presence of condensing agents such as aluminium chloride, iron chloride, sulphuric acid and the like.

A preferred embodiment of the invention consists in using sulphuric acid as condensing agent and as substance causing ring formation, as in that case no intermediate products have to be separated and the desired products may be obtained directly.

It is further of advantage to use the aromatic hydrocarbon for the condensation reaction in great excess, in order to improve the mixing of the reaction mixture, or to work with inert diluting agents such as carbon disulphide, tetrachloroethane and the like instead of using an excess of the aromatic hydrocarbon.

Example 1

1 mol of finely powdered potassium salt of the beta phthalic acid anhydride sulphonic acid (Annalen der Chemie, Vol. 233, page 216) are intimately mixed with 2 mols of finely powdered aluminium chloride. One part by weight of this mixture and about ten parts by weight of benzene are heated under reflux with careful stirring on a water bath or the like, keeping the benzene boiling. As soon as the generation of hydrochloric acid, which is violent in the beginning, has ceased, the excess of benzene is removed from the reaction product by distillation with steam. The residue obtained is boiled with a solution of potassium carbonate. The aluminium hydroxide sludge is separated by filtration and the solution of the potassium salt of the sulphonic acid of benzoylbenzoic acid is evaporated to dryness. The dry product obtained is stirred with two parts by weight of concentrated sulphuric acid and after evaporation of the hydrochloric acid generated thereby heated to about 140° C. until the reaction is finished. The reaction product is poured into a corresponding amount of water, thus obtaining a finely crystalline precipitate of the potassium salt of anthraquinone-2-sulphonic acid, which is in the usual manner separated from the mother liquor. The yield is nearly quantitative.

The method described can also be carried out with the sodium salt of the phthalic acid anhydride sulphonic acid. In this case sodium carbonate is used instead of potassium carbonate for the precipitation of aluminium hydroxide.

The alkali metal carbonate used can also be replaced by corresponding amounts of potassium sulphate, thus precipitating the aluminium as potassium alum after cooling.

Instead of using the potassium or sodium salt of the phthalsulphonic acid also other salts, such as the aluminium salt, can be employed.

Example 2

The potassium salt of the beta phthalic acid anhydride sulphonic acid used in Example 1 is replaced by the isomeric alpha phthalic acid anhydride sulphonic acid, which is treated in the same manner as described in Example 1. The reaction product obtained with the same good yields is the potassium salt of the anthraquinone-1-sulphonic acid.

Example 3

If the benzene used in Example 1 is replaced by chlorobenzene the salt of the chloro-anthraquinone-2-sulphonic acid is obtained.

The same result is obtained, when no excess of chlorobenzene but only 1 mol of this product is employed and the reaction mixture is diluted by five parts by weight of tetrachloroethane or carbon disulphide.

Example 4

1 mol of para chlorophenol or 1 mol of hydroquinone and 1, 1 mol of the potassium salt of beta phthalic acid anhydride sulphonic acid are dissolved together and 3 to 4 mol of boric acid and ten times the amount of sulphuric acid of 66° Bé., calculated on the weight of the para chlorophenol, are added. The mixture is slowly heated to about 180 to 200° C. and kept at this temperature until the reaction is finished. The reaction mixture is then poured into a mixture of ice and water and on standing crystallizes the obtained 5,8-dihydroxy-anthraquinone-2-sulphonic acid. The reaction mixture can also be worked up by treatment with lime and sodium carbonate.

Instead of employing the potassium salt or other salts of the beta phthalic acid anhydride sulphonic acid also the beta phthalsulphonic acid or the reaction mixture obtained by sulphonation of phthalic acid anhydride can be used together with an excess of sulphuric acid.

In the examples the sulphonic acids of the phthalic acid may be replaced by other sulphonation derivatives of the phthalic acid, such as the phthalic acid anhydride disulphonic acid, in which case disulphonic acids of anthraquinone are obtained, in which two sulpho groups are in the same benzene ring. These substances cannot be obtained by direct sulphonation of anthraquinone.

When the benzene or chlorobenzene in the examples are replaced by naphthalene or tetrahydronaphthalene the corresponding sulphonic acids of the naphthanthraquinone or its hydrogenation product are obtained.

The foregoing detailed examples have been given for clearness of understanding only, and no unnecessary limitations should be understood therefrom, but the appended claims should be construed as broadly as permissible in view of the prior art.

In these claims the term phthalic acid anhydride sulphonic acids also includes the salts of these acids and the term aromatic hydrocarbons also their substitution products.

I claim:

1. A method for making sulphonic acids of substances of the anthraquinone series which comprises condensing sulphonic acids of phthalic acid anhydride with aromatic hydrocarbons and treating the sulphonic acids of aroylarylcarboxylic acids obtained as condensation products with substances causing ring formation in such a manner as to effect ring formation.

2. A method according to claim 1 in which the condensation is carried out with an excess of aromatic hydrocarbons.

3. A method according to claim 1 in which the condensation is carried out in presence of inert diluents.

4. A method according to claim 1 in which sulphuric acid is used as condensing agent and as substance causing ring formation.

5. A method for making anthraquinone-beta-monosulphonic acid which comprises condensing beta phthalic acid anhydride sulphonic acid with benzene in presence of aluminium chloride and treating the benzoyl-benzoic acid beta monosulphonic acid obtained with substances causing ring formation in such a manner as to effect ring formation.

6. A method according to claim 5 in which sulphuric acid as substance causing ring formation is used.

7. A method for making sulphonic acids of aroylarylcarboxylic acids which comprises condensing sulphonic acids of phthalic acid anhydride with aromatic hydrocarbons.

In testimony whereof I affix my signature.

ERWIN SCHWENK.